(No Model.) 2 Sheets—Sheet 1.
H. F. BROWN.
METHOD OF TREATING ORES BY CHLORINATION.
No. 589,999. Patented Sept. 14, 1897.
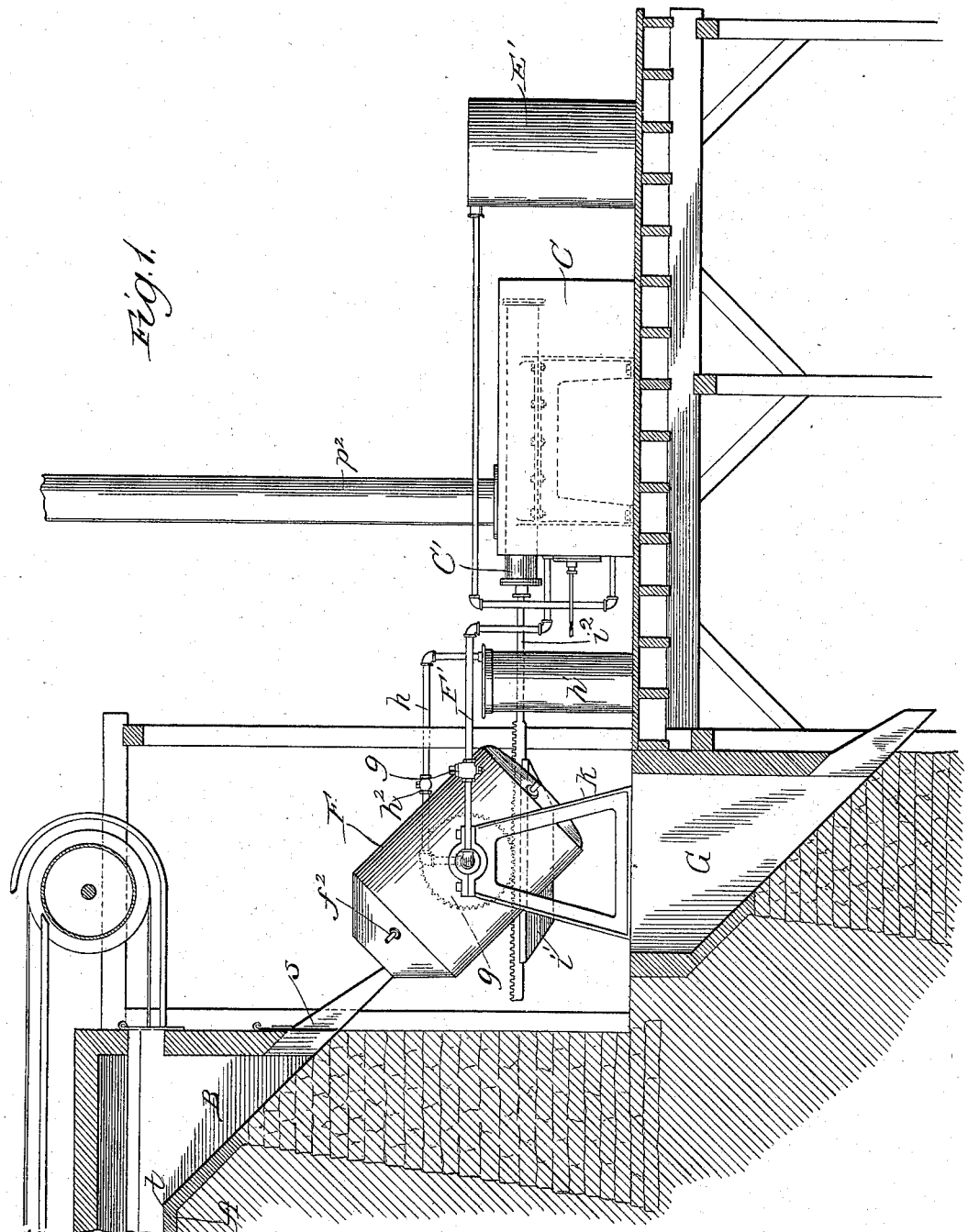

(No Model.) 2 Sheets—Sheet 2.
H. F. BROWN.
METHOD OF TREATING ORES BY CHLORINATION.
No. 589,999. Patented Sept. 14, 1897.
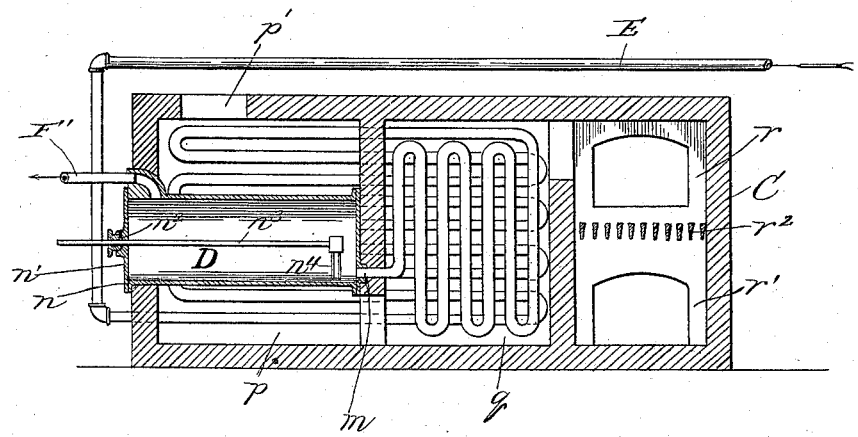
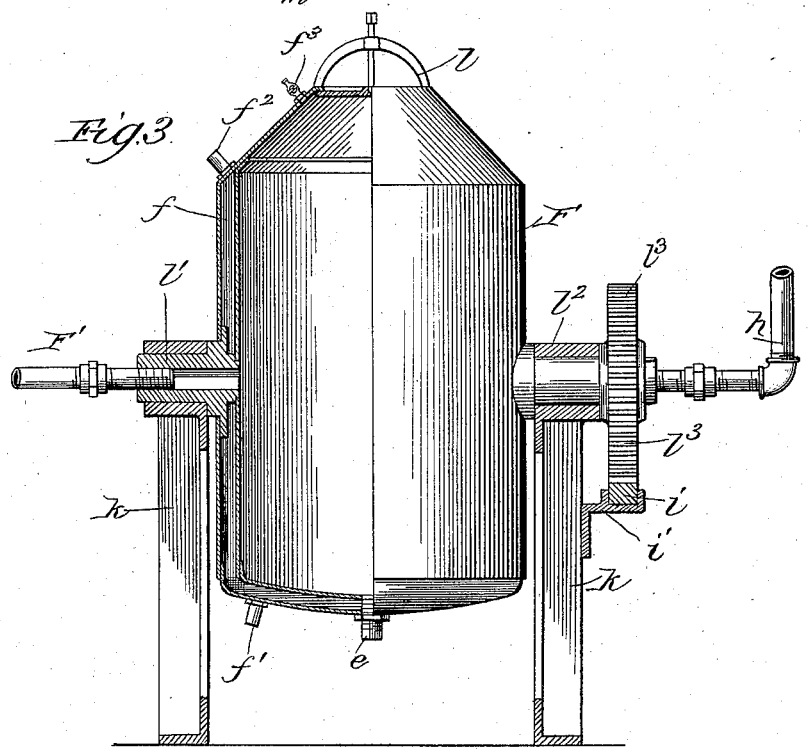
Witnesses:
Inventor:
Horace F. Brown,
By Dyrenforth & Dyrenforth,
Attys.

UNITED STATES PATENT OFFICE.

HORACE F. BROWN, OF CHICAGO, ILLINOIS.

METHOD OF TREATING ORES BY CHLORINATION.

SPECIFICATION forming part of Letters Patent No. 589,999, dated September 14, 1897.

Application filed May 12, 1897. Serial No. 636,190. (No specimens.)

*To all whom it may concern:*

Be it known that I, HORACE F. BROWN, a citizen of the United States, residing at Chicago, in the county of Cook and State of Illinois, have invented a new and useful Improvement in Methods of Treating Ores by Chlorination, of which the following is a specification.

My invention relates to an improved method or process of extracting metals from their gangue or matrix, and has more especial reference to the treatment of complex gold and silver milling ores.

My object is to provide an improved method of treating complex—particularly gold and silver—ores by chlorination, whereby the gold, silver, and other chlorids of sufficient value may be saved with a minimum of waste in one practically continuous operation.

Hitherto in the treatment of complex ores containing both gold and silver and high in silica and associated with sulfur in the form of iron and copper pyrites it has been usual first to crush the ore to the required state of subdivision and then subject it to a thorough roasting for breaking up the sulfid compounds and eliminating to a more or less extent the more volatile base metals. The after treatment depended upon which of the precious metals predominated in the ore and was directed to the saving of the metal which alone would yield the greatest value at the sacrifice of all or the greater part of the other metal or metals. Where the predominating value was gold, the more common practice has been to charge the calcined ore, after first cooling it, into a barrel or other receptacle for chlorination. It has been usual to develop the chlorin gas in the receptacle or barrel itself with sulfuric acid and chlorid of lime. Sufficient water was charged into the receptacle with the ore to form a pulp of the desired consistency, and after charging in the chemicals the receptacle or barrel was closed and revolved for a sufficient length of time to permit liberation of the chlorin and the chlorination of the gold. After the gold contents had been changed to a soluble chlorid they were leached out from the pulp by water into a suitable precipitating-tank, the precipitant being collected, dried, and melted into bars.

Where the predominating value was silver, it has been usual to roast the ore with salt, the chlorin being liberated by the action of the heat and the sulfurous-acid gases that were evolved in the process of roasting. Under heat the silver was rapidly changed to a chlorid and became a stable compound. After the chloridizing process described it has been usual to leach out the silver from the roasted ore by means of suitable leaching solutions, such as hyposulfite or saturated brine.

In carrying out the first said process, commonly called "gold chlorination," little or none of the silver can be saved, for the reason that while a high degree of heat must be avoided in gold chlorination it is necessary in chloridizing silver. At a low temperature silver is not acted upon to any material extent by chlorin gas, and as a consequence in the leaching process which follows for the recovery of the gold the silver, not being soluble, is lost in the tailings.

In carrying out the second process—that of roasting the ore in the furnace with salt for the purpose of chloridizing the silver—a large proportion, at least, of the gold is lost by volatilization, as chlorids of gold cannot be formed under a high degree of heat.

In carrying out my improved method of chlorination as I at present prefer to practice my invention I first crush the ore to the desired state of subdivision, then treat it in a roasting-furnace until calcined to the desired degree, and then charge the ore in a highly-heated state into a close receptacle, where, while still at a high temperature, it is subjected to the action of chlorin gas for the purpose of chloridizing the silver. The body of ore thus treated is then cooled, and in that state and while still confined to prevent the escape of volatile parts of the ore its subjection to the action of the chlorin gas is continued, if necessary, for the purpose of chlorinating the gold. As a result of this process thorough action of the chlorin upon the silver takes place, and as the temperature falls below, say, 180° centigrade both the volatile and metallic gold contents are reduced to a stable chlorid.

My present invention has nothing to do with the after treatment of the chloridized pulp, and both the gold and silver contents, thoroughly reduced to chlorids, may be saved by any of the well-known solvent or amalgamating processes.

To carry out my improved method of treating complex gold and silver ores in one continuous operation for the purpose of saving both the gold and silver without material waste of either, as described, I have devised improved apparatus which may be employed, though my invention is not to be limited to the use thereof, or, in fact, to any particular mechanism.

In the drawings, which show one form of apparatus of my improved construction for carrying out my improved method, Figure 1 is a broken sectional view in the nature of a diagram, showing the discharge end of a roasting-furnace with my improved apparatus in connection therewith; Fig. 2, an enlarged sectional view of a furnace for generating chlorin gas; and Fig. 3, a broken view, partly in section and partly in elevation, of a close receptacle in which my improved method is carried on.

A is an oar-roasting furnace, only the discharge end of which is shown. Any suitable form of furnace may be employed, though I prefer for various reasons, and especially where ores in large quantities are to be treated, to employ a mechanical rabble reverberatory furnace of the general pattern shown, for example, in Letters Patent No. 489,143, granted to me January 3, 1893. The ore fed to the furnace is stirred and advanced along the furnace-floor $t$ and discharged therefrom into a storage-hopper B, which may be of the construction shown and provided at its lower end with one or more valved outlet-chutes $s$.

C is a chlorin-gas-generating furnace. (Shown in detail in Fig. 2.) The furnace C (shown) has a combustion-chamber $r$ and an ash-pit $r'$, separated by a grate $r^2$. Back of the combustion-chamber and ash-pit and in open communication with the former is a chamber $q$, which opens at its lower side into a chamber $p$. At the top of the chamber $p$ is an outlet $p'$, leading to a chimney $p^2$. Mounted in the chamber $p$ is a receptacle or generator D, having an open end $n$, accessible from the rear end of the furnace. Fitting over the opening $n$ is a removable head or cap $n'$, provided at its center with a stuffing-box $n^2$, through which extends a stirring-rod $n^3$, provided with a head having teeth $n^4$ in the receptacle.

E is an air-supply pipe passing from the outside of the furnace through and coiled in the chambers $p$ and $q$ and extending at $m$ into the end of the generator D.

F is a close receptacle provided at its upper end with a removable cap $l$. The receptacle shown in the drawings is provided on opposite sides with hollow trunnions $l'$ $l^2$, journaled in supports $k$. On one of the journals is a gear-wheel $l^3$, which fits into a longitudinally-reciprocal rack $i$, mounted to slide on a guide $i'$ on one of the supports $k$.

C' is a steam-cylinder provided with the usual reciprocating piston which communicates, through the medium of the rod $i^2$, with the rack. Extending from the upper side of the generator D is a pipe F', leading to the trunnion $l'$ of the receptacle F. Extending from the trunnion $l^2$ is an outlet-pipe $h$, leading to a water-tank $h'$. Interposed in the pipe $h$ is a back-pressure or pop valve $h^2$.

Salt and sulfur, which latter may be in the form of iron sulfid, is charged into the generator D, after which the head $n'$ is fastened in place to render the receptacle gas-tight. The pipe E may extend from a compressed-air reservoir E', whereby air under pressure is forced through the pipe and coil in the furnace-chamber to the generator. The products of combustion from the fire-chamber $r$ pass into the chamber $q$ and downward through the latter to the chamber $p$, whence they escape through the outlet $p'$. On their way the hot products of combustion heat the coil and generator D. Under the action of the heat the salt and sulfur in the generator are raised to a high temperature, the heated air passing thereto from the coil furnishing the requisite amount of oxygen for forming sulfuric anhydrid, which decomposes the salt and liberates the chlorin. The charge may be stirred at intervals by reciprocating the rod $n^3$.

The reactions which take place in the generator D during the formation of chlorin are complicated, and just the order in which they occur may be open to dispute. If sulfur and salt are mixed together and hot air is passed over the mixture the reaction which would cause the freeing of the chlorin would be about as follows: Some of the sulfur would be oxidized to sulfurous anhydrid, ($SO_2$.) Some of it would be further oxidized to $SO_3$, which would, in connection with the excess of oxygen present, decompose the salt and free the chlorin, and the reaction written out would be about as follows:

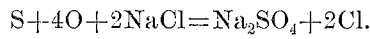
$$S+4O+2NaCl=Na_2SO_4+2Cl.$$

In case iron pyrites ($FeS_2$) are used the reaction would be something like the following, assuming that all the sulfur in the iron pyrites would be utilized in decomposing the sodium chlorid:

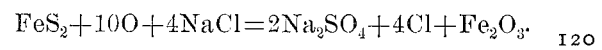
$$FeS_2+10O+4NaCl=2Na_2SO_4+4Cl+Fe_2O_3.$$

It is to be understood that the mere generation of chlorin gas has nothing to do with my present invention, and I merely show a generator which may be employed where liquid chlorin cannot be cheaply obtained, or where for other reasons the generator may be desirable.

When a sufficient charge of calcined ore has accumulated in the storage-hopper B, the vessel F is turned to permit the ore to be fed thereto through the chute $s$ until the receptacle is filled. The cap $l$ is then fastened in place to render the receptacle gas-tight. A valve $g$ in the pipe F' is then opened to permit chlorin gas to be forced from the generator D to the receptacle F. The gas being heavier than the atmosphere in the receptacle tends initially to sink in the receptacle and force the air through a vent-cock $f^3$ on the receptacle, which cock should be initially opened. The air is thus soon discharged from the receptacle, and the cock $f^3$ should be closed when chlorin gas commences to escape therefrom. The inflow of gas is continued until the receptacle is filled and until sufficient time elapses for the chlorination of all the metals. Any escape of gas due to excessive pressure through the safety-valve $h^2$ will pass into the water-tank $h'$, where it will be absorbed and any metallic contents precipitated.

It will be understood that in the process of chloridizing silver and gold ore in the receptacle F the chemical reactions are so vigorous that a large percentage of the gold contents are volatilized and form metallic fumes or vapors. The valve $h^2$ in the construction shown is not to be considered as changing the character of the vessel F from that of a close receptacle and is merely an adjunct or safety appliance which will relieve the pressure in the receptacle when it becomes higher than necessary or desirable. Any chlorin gas that may escape through the valve $h^2$ may carry with it some of the metallic fumes or vapors, and these will be condensed in the tank $h'$ and thus rendered capable of being saved. Any chlorin gas passing to the tank $h'$ need not necessarily be lost, but may be withdrawn and used over again.

In treating certain classes of ores, and especially those wherein silver largely predominates, there is danger that the gold contents to a more or less extent will become coated by the silver chlorid, whereby in the after treatment they will be shielded against the action of the chlorin gas. To obviate any such difficulty, I provide the mechanism shown for agitating the contents of the receptacle. This agitation is effected by starting the motor C' to reciprocate the rack $i$ and oscillate the receptacle on its bearings $k$ $k$. The attrition of the particles of ore upon each other in the oscillation of the receptacle tends to wear off any silver that may adhere to the particles of gold, leaving the latter freely exposed to the action of the chlorin gas.

As long as the temperature remains above about 180° centigrade no stable gold chlorids are formed, but as the ore is cooled below that point all the volatile chlorids and metallic gold are changed to a stable gold chlorid. Therefore the ore is permitted to remain in the receptacle until it is cooled below 180° centigrade or thereabout. To facilitate the cooling, the receptacle F is formed with an inner and outer wall, leaving an intervening space $f$. Cold water, air, or other gas may be forced through or expanded in this space to rapidly absorb heat to effect the cooling of the receptacle and its contents as speedily as may be desired. The cooling fluid may enter the space or jacket $f$ through a hose attached at $f'$ and escape through an outlet $f^2$. In the base of the receptacle F, I prefer to provide an inlet $e$, through which steam or water may be forced, when desired, to moisten the contents of the receptacle during or after treatment.

As the receptacle F becomes initially charged with the heated chlorin atmosphere the latter is forced through all the interstices of the ore, so that the metal contents are quickly acted upon and the silver contents changed to chlorids. As the supply of chlorin atmosphere is kept up and the temperature of the receptacle and contents lowered to a point below 180° or thereabout stable gold chlorids are formed, after which the entire contents of the receptacle may be abstracted, as by dumping them into the receptacle G, without danger of losing any of the values by volatilization. After its withdrawal from the receptacle F the chloridized pulp may be treated by any suitable process or processes to save the gold and silver contents.

While the apparatus shown and described in the drawings is desirable, it may be variously modified to suit varying conditions. It is not necessary in a large number of cases that the receptacle in which the method is carried on shall be oscillated or otherwise agitated, nor is it necessary, except generally for the mere saving of time, to provide artificial cooling means for the receptacle. If desired, the receptacles in which the method is carried on may be in any location with relation to the furnace and be charged either from the furnace direct, as shown, or by transporting the ore from the furnace to the receptacles. Any desired number of receptacles may be provided and their contents treated all simultaneously or at different times by charging them with chlorin gas. The furnace for generating chlorin gas which I show is a good construction where it is desirable to generate the gas quickly and in large quantities, but any other suitable chlorin-gas applying or generating means may be employed. If desired, the chlorin gas may be generated in the receptacle itself.

The gist of my invention lies in treating ore by chlorination in a close receptacle to prevent the escape of volatile parts, and its more especial value lies, so far as I am at present aware, in treating complex gold and silver ores with chlorin gas first in a highly-heated state to chloridize the silver and then under a temperature sufficiently low to form stable gold chlorids. This process may be carried on continuously in a close vessel, as described, or it may be carried on by treating it to chloridize the silver in one close receptacle and then discharging it, without material exposure to the atmosphere, to a second close receptacle, where it may cool in a chlorin atmosphere to form the gold chlorids, or the volatilized portions only of the charge may be withdrawn into a separate receptacle or receptacles and cooled. Hence while some of the appended claims refer to cooling the contents of the receptacle the invention is not to be limited to the cooling of such contents in the one original chamber. The purpose is to prevent the material escape and loss of volatilized portions of the ore which carry values, and the receptacle, broadly considered, may be one chamber or a series of chambers to or through which the original charge, in whole or in part, may be transferred to facilitate treatment and without such exposure to the atmosphere as will cause material loss of the volatilized portions of the ore. Thus it will be readily seen that the method and apparatus above specifically described may be variously modified without departing from the spirit of my invention as defined by the claims.

What I claim as new, and desire to secure by Letters Patent, is—

1. The method of treating ore, which consists in confining it in a highly-heated state against the escape and loss of the volatilized parts of the ore, subjecting it while confined to the action of chlorin gas and then permitting the said volatilized parts to cool under confinement and form stable chlorids, substantially as and for the purpose set forth.

2. The method of treating ore, which consists in confining it in a highly-heated state against the escape and loss of the volatilized parts of the ore, subjecting it while confined to the action of chlorin gas and moisture, and permitting the said volatilized parts to cool under confinement and form stable chlorids, substantially as and for the purpose set forth.

3. The method of recovering by chlorination, in a practically continuous treatment the values from ores bearing gold, and also bearing metal requiring for its recovery to be chlorinated in the presence of a high temperature, which consists in first roasting the ore, then charging it into a close receptacle, and there chlorinating it while in its hot condition and thereupon cooling the contents of the receptacle while confined and subjecting the same to the action of chlorin gas, substantially as and for the purpose set forth.

4. The method of treating ore by chlorination, which consists in subjecting the ore while confined in a close receptacle and at a high temperature to the action of chlorin gas, and then lowering the temperature of the contents of the receptacle, and subjecting the same, while confined against the escape of volatile parts of the ore, to the action of chlorin gas, substantially as and for the purpose set forth.

5. The method of treating ore, which consists in first charging it in a highly-heated state into a close receptacle, then forcing into the receptacle chlorin gas under pressure, then permitting the contents of the receptacle to cool while confined and maintaining the supply of chlorin gas throughout, substantially as and for the purpose set forth.

6. The method of treating ores containing gold and silver, which consists in charging the ore in a highly-heated state into a close receptacle, there subjecting it to the action of chlorin gas to chloridize the silver, then cooling the ore while still confined in the receptacle below the point where stable gold chlorids are formed, meanwhile keeping up the supply of chlorin gas, substantially as described.

7. The method of treating ore by chlorination, which consists in confining it in a highly-heated state in a close receptacle, there subjecting it to the action of chlorin gas, agitating the receptacle and cooling the ore while still subjected to the action of the chlorin gas in the close receptacle, substantially as and for the purpose set forth.

8. The method of treating ore by chlorination, which consists in confining it in a highly-heated state in a close receptacle, there subjecting it to the action of chlorin gas and moisture, agitating the receptacle and cooling the ore while still subjected to the action of the chlorin gas in the close receptacle, substantially as and for the purpose set forth.

HORACE F. BROWN.

In presence of—
J. H. LEE,
R. T. SPENCER.